United States Patent
Suh et al.

(10) Patent No.: US 8,041,445 B2
(45) Date of Patent: Oct. 18, 2011

(54) TRANSFORMATION METHOD OF G-CODE INTO STEP-NC PART PROGRAM

(75) Inventors: Suk-hwan Suh, Pohang-si (KR); Seung-jun Shin, Goyang-si (KR)

(73) Assignee: Postech Academy-Industry Foundation, Pohang-si (KR)

( * ) Notice: Subject to any disclaimer, the term of this patent is extended or adjusted under 35 U.S.C. 154(b) by 759 days.

(21) Appl. No.: 12/160,089

(22) PCT Filed: Jan. 31, 2006

(86) PCT No.: PCT/KR2006/000329
§ 371 (c)(1),
(2), (4) Date: Jul. 3, 2008

(87) PCT Pub. No.: WO2007/078025
PCT Pub. Date: Jul. 12, 2007

(65) Prior Publication Data
US 2008/0281462 A1    Nov. 13, 2008

(30) Foreign Application Priority Data
Jan. 4, 2006   (KR) .................. 10-2006-0000935

(51) Int. Cl.
  *G05B 19/18*   (2006.01)
  *G05B 19/4093*   (2006.01)
(52) U.S. Cl. ......................................... 700/160; 700/87
(58) Field of Classification Search .................. 700/18, 700/86, 87, 89, 159, 160, 180–184, 250–252
See application file for complete search history.

(56) References Cited

U.S. PATENT DOCUMENTS 4,890,234 A * 12/1989 Tanaka et al. ................. 700/181
5,028,923 A *  7/1991 Seki et al. ..................... 341/106
(Continued)

FOREIGN PATENT DOCUMENTS
KR   1020030058445 A    7/2003
WO   WO 03/079123 A1    9/2003

OTHER PUBLICATIONS

International Search Report mailed Oct. 4, 2006, issued in corresponding International Application No. PCT/KR2006/000329, filed Jan. 31, 2006.

(Continued)

*Primary Examiner* — Maria Von Buhr
(74) *Attorney, Agent, or Firm* — Christensen O'Connor Johnson Kindness PLLC

(57) ABSTRACT

A method of transforming a G-code type part program into a STEP-NC language type part program is provided and more particularly, a method is provided for enabling a G-code type part program mainly used in the field to be easily applied to a STEP-NC controller without a troublesome correction. A STEP-NC language type part program is automatically created, which is composed of machining operation information, manufacturing feature information, machining strategy information and the like, through a process of analyzing G-codes from the G-code type part program and tool information. A method of transforming a G-code into a STEP-NC part program includes receiving a G-code part program, tools and a numerical controller; creating G-code block information, and partitioning the entire part program on a workingstep basis. The method further includes creating machining strategy information and creating the STEP-NC part program by arranging the machining workingsteps.

7 Claims, 6 Drawing Sheets

U.S. PATENT DOCUMENTS

| | | | | |
|---|---|---|---|---|
| 5,159,558 | A | * | 10/1992 | Seki et al. ............... 700/185 |
| 5,229,950 | A | * | 7/1993 | Niwa ....................... 700/181 |
| 5,270,918 | A | * | 12/1993 | Seki et al. ............... 700/86 |
| 6,424,883 | B1 | * | 7/2002 | Hosokawa et al. ....... 700/181 |
| 6,502,007 | B1 | * | 12/2002 | Kanamoto et al. ....... 700/173 |
| 6,512,961 | B1 | * | 1/2003 | Fukaya et al. ........... 700/174 |
| 6,795,749 | B2 | * | 9/2004 | Suh et al. ................. 700/181 |
| 7,099,737 | B2 | * | 8/2006 | Suh et al. ................. 700/174 |
| 2008/0281463 | A1 | * | 11/2008 | Suh et al. ................. 700/182 |

OTHER PUBLICATIONS

International Preliminary Examination Report mailed Jul. 8, 2008, issued in corresponding International Application No. PCT/KR2006/000329, filed Jan. 31, 2006.

Proctor et al., "Tying together design, process planning and machining with STEP-NC technology," World Automation Congress, *IEEE Proceedings of the 5th Biannual.*, (14) 33-38, Jun. 9-13, 2002.

* cited by examiner

[Fig. 1]
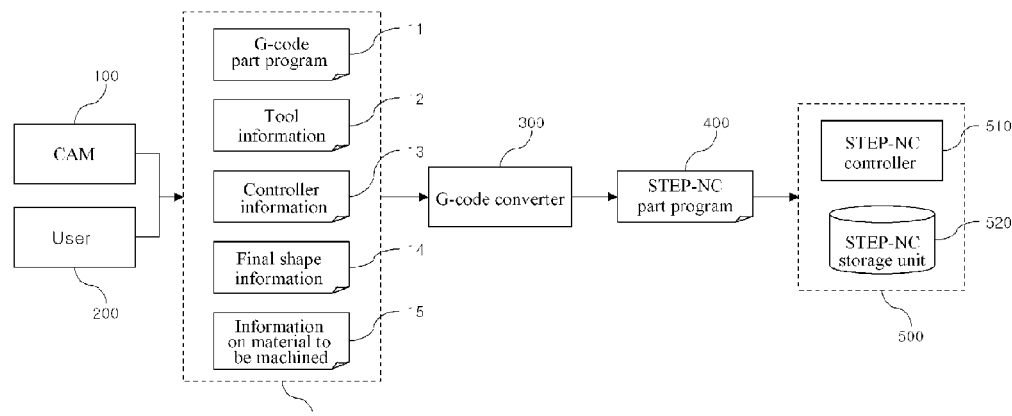
[Fig. 2]
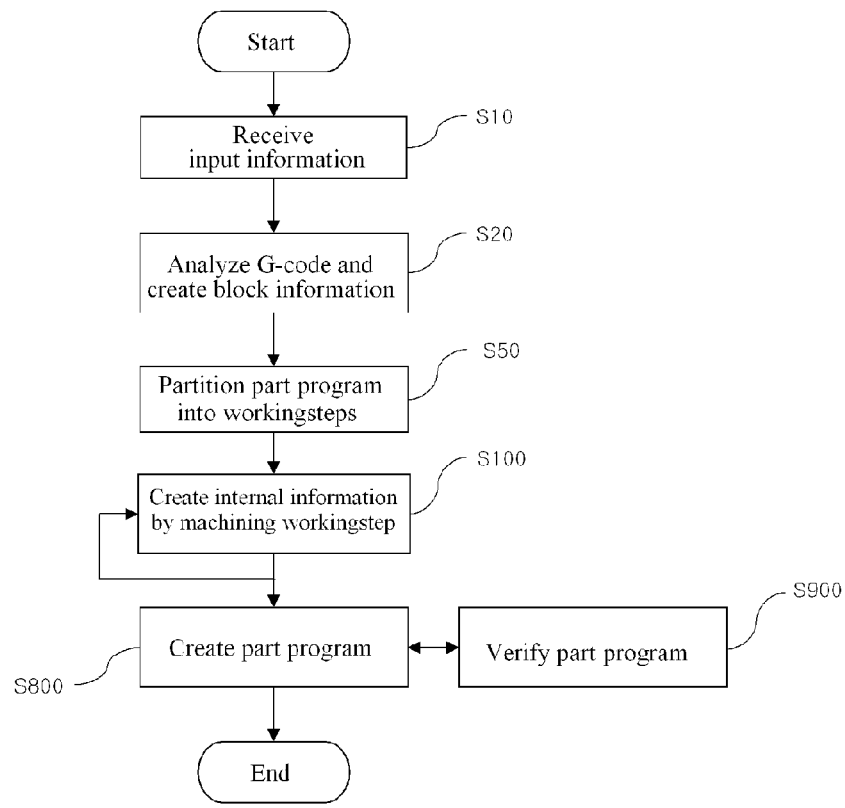

[Fig. 3]
| Data | Type |
|---|---|
| G-code | Integer |
| Feed end point | Point (X, Z) |
| Feed start point | Point (X, Z) |
| Feed radius | Real number |
| Feedrate | Real number |
| Spindle speed | Real number |
| Maximum spindle speed | Real number |
| Tool number | Integer |
| Tool compensation type | Off, On-Left, On-Right |
| Tool compensation value | Point (X, Z) |
| Trajectory direction | Vector (X, Z) |
| Trajectory length | Real number |
[Fig. 4]
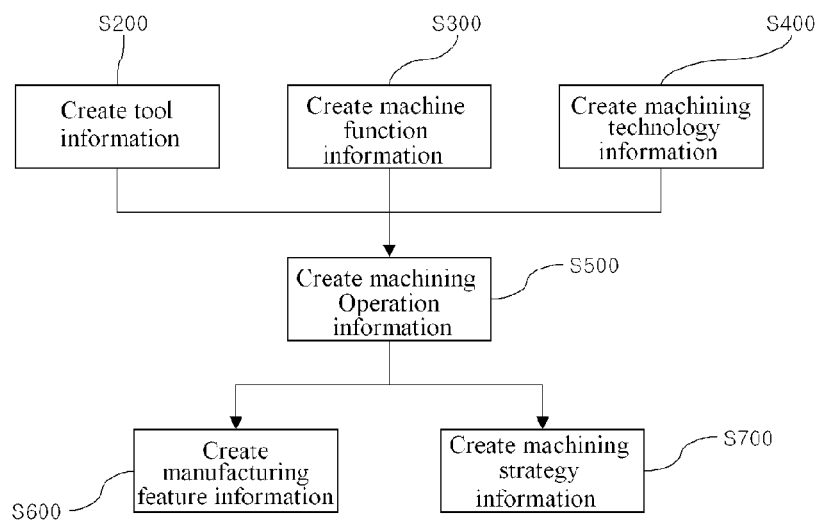

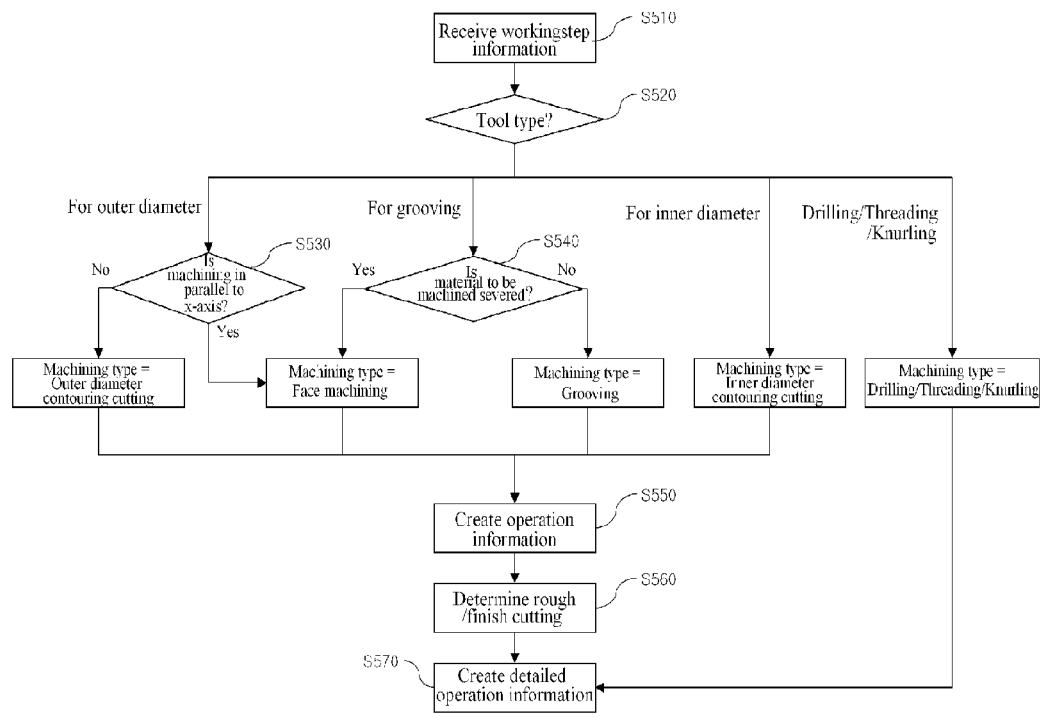

| Operation | Rough/finish cutting determining conditions | Result value | Detailed operation |
|---|---|---|---|
| Outer diameter contouring cutting | (Outer diameter contouring finish cutting tool) OR (Presence of previous outer diameter contouring rough cutting) OR (High spindle speed) OR (Low feedrate) | TRUE | Outer diameter contouring finish cutting |
| | | FALSE | Outer diameter contouring rough cutting |
| Face machining | (Face finish machining tool) OR (Presence of previous face rough machining) OR (High spindle speed) OR (Low feedrate) | TRUE | Face finish machining |
| | | FALSE | Face rough machining |
| Grooving | (Presence of previous rough grooving) OR (High spindle speed) OR (Low feedrate) | TRUE | Finish grooving |
| | | FALSE | Rough grooving |
| Inner diameter contouring cutting | (Inner diameter contouring finish cutting tool) OR (Presence of previous inner diameter contouring rough cutting) OR (High spindle speed) OR (Low feedrate) | TRUE | Inner diameter contouring finish cutting |
| | | FALSE | Inner diameter contouring rough cutting |
| Drilling | – | – | Drilling |

[Fig. 7]

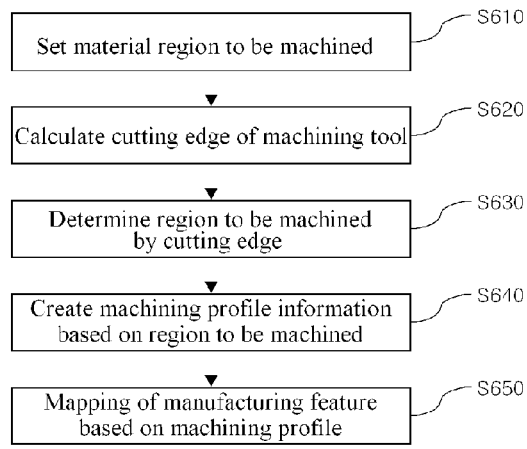

[Fig. 8]

| Machining operation | Number of profile-defining elements | | Type of profile-defining element (Segment, Arc) | | Slope of profile-defining element | | Feature |
|---|---|---|---|---|---|---|---|
| | One | Two or more | Segment | Arc | None | Presence | |
| Face | O | | O | | O | | circular_face |
| Outer, inner diameter | O | | O | | O | | outer_diameter |
| Outer, inner diameter | O | | | O | | | revolved_round |
| Face, outer/inner diameter | O | | O | | | O | revolved_flat |
| Face, outer/inner diameter | | O | | | | | general_revolution |
| Groove | | O | O | | | | groove |
| Drill | | O | O | | | | round_hole |

[Fig. 9]

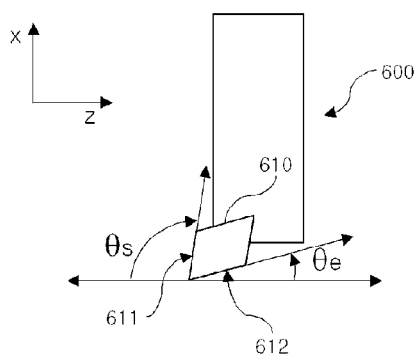

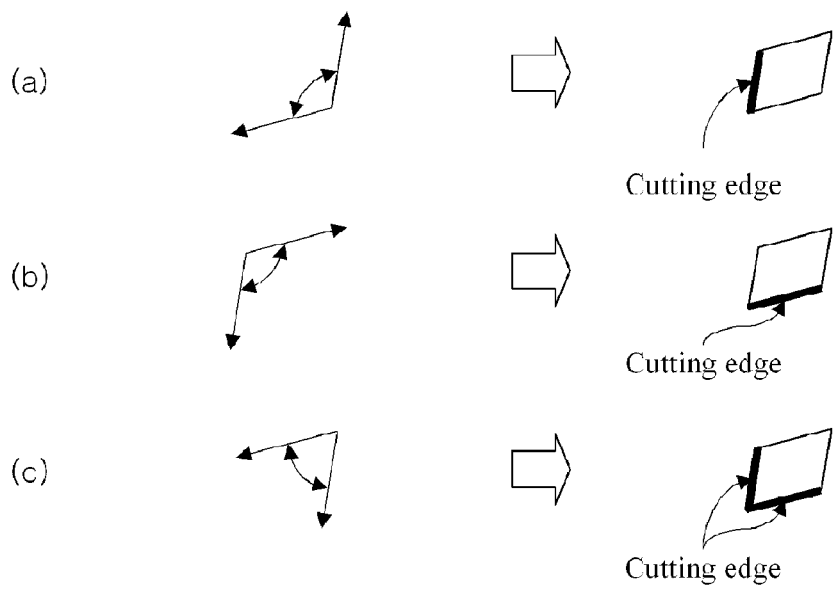
[Fig. 10]
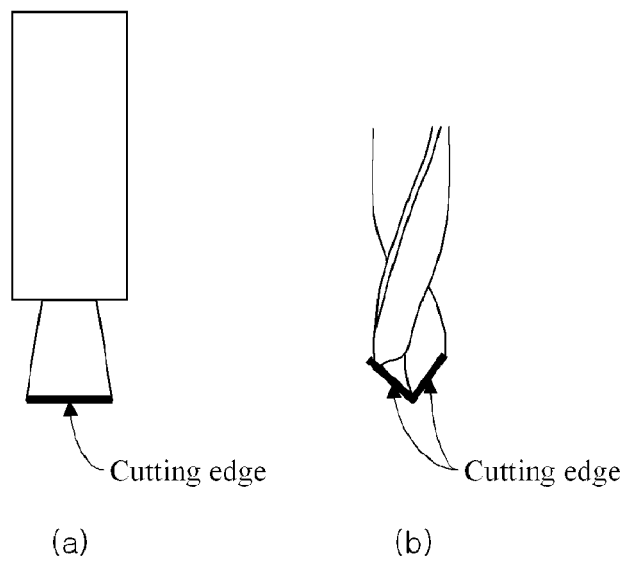
[Fig. 11]

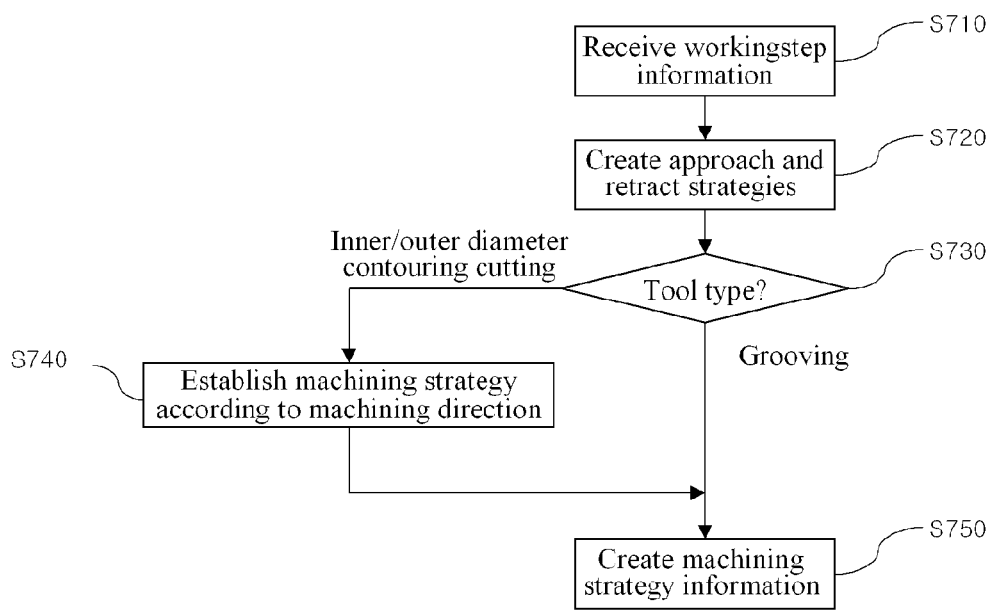
[Fig. 12]

TRANSFORMATION METHOD OF G-CODE INTO STEP-NC PART PROGRAM

CROSS REFERENCE TO RELATED APPLICATIONS

This application is a U.S. National Phase of International Patent Application No. PCT/KR2006/000329, filed 31 Jan. 2006, which claims the benefit of Korean Patent Application No. 10-2006-0000935, filed 4 Jan. 2006, the disclosures of both applications are incorporated herein by reference.

TECHNICAL FIELD

The present invention relates to a method of transforming a G-code type part program into a STEP-NC language type part program, and more particularly, to a method for enabling a G-code type part program mainly used in the field to be easily applied to a STEP-NC controller without a troublesome correction by automatically creating a STEP-NC language type part program, which is composed of machining operation information, manufacturing feature information, machining strategy information and the like, through a process of analyzing G-codes from the G-code type part program and tool information.

BACKGROUND ART

Since a three-axis numerically controlled milling machine was developed in the MIT in 1952, numerical control (NC) machining techniques have been remarkably developed and evolved into computer numerical control (CNC) machining techniques along with advancements in electronic engineering technologies including micro-processor technologies.

A CNC machining method that is most generally used in the field is a method of creating a part program from shape design information including drawings of a product through computer-aided design/computer-aided manufacturing (CAD/CAM) software and inputting the part program into a machine tool mounted with a CNC controller (hereinafter, referred to as a CNC machine tool), thereby performing machining.

In such a CNC machining method, an operator makes a process plan including a material feature, a removal volume, a removal sequence, tools to be used, machining conditions and the like based on hard-copy drawings or a product feature created by a CAD system. Based on the process plan, the operator creates a part program, which specifies operations of tools and a CNC machine tool, in a certain code format (G-code) through the CAD system or a manual operation. The CNC controller controls operations of the machine tool in response to an inputted G-code type part program so that an initial raw material can be machined into a product with a desired shape.

The G-code is a kind of machine language that expresses an operation of a machine tool as the position, speed and the like of a tool or a feed shaft, and is most generally used in the form of a part program. However, since the G-code supports only linear motions (G01) and circular motions (G02 and G03) of the feed shaft, high quality machining is difficult. Further, since the G-code does not have geometric information of a product, it is not suitable for five-axis machining or high speed machining.

Further, since the G-code does not have a variety of information related to a process, machining conditions optimized through actual machining cannot be fed back to CAD/CAM. Furthermore, since each machine tool manufacturer has a different G-code system, it is difficult to exchange data between different systems, and thus, additional post-processing is needed to exchange data.

Recently, a STEP-NC language based on a STEP (STandard for the Exchange of Product Model data) data model is spotlighted as a new programming language to solve the problems. The STEP-NC language defines process plan information capable of creating axial motions, such as feature information, machining sequences, machining methods and tool information, instead of directly specifying the axial motions. Therefore, high quality machining can be achieved, and machining information can be bi-directionally exchanged on a CAD-CAM-CNC process chain. Further, since the STEP-NC language is an international standard language neutral to a CNC controller, there is an advantage in that post-processing for compatibility is not required.

At present, the STEP-NC controller that analyzes a part program prepared with such a STEP-NC language and then directly creates axial motions is almost put to practical use. When the STEP-NC controller is newly applied to industrial fields in the future, a user will suffer from troubles of converting numerous programs, which have been previously prepared with the G-code, into STEP-NC programs. Thus, it is a high possibility that incompatibility between the G-code and the STEP-NC program will be an obstacle to expanding the use of the STEP-NC controller.

DISCLOSURE OF INVENTION

Technical Problem

The present invention is conceived to solve the aforementioned problems. Accordingly, an object of the present invention is to provide a part program conversion method of automatically converting a G-code type part program and tool information into a STEP-NC language type part program, thereby enabling the G-code type part program mainly used in the field to be easily applied to a STEP-NC controller.

Technical Solution

According to an aspect of the present invention for achieving the object, there is provided a method of transforming a G-code into a STEP-NC part program comprising the steps of: receiving a G-code part program needed for creating the STEP-NC part program, tool information, and information on a numerical controller capable of analyzing a corresponding G-code; analyzing the received G-code part program according to the type of the numerical controller, and creating G-code block information; detecting a featured block by using the G-code block information, grouping G-code blocks along a boundary of the featured block, and partitioning the entire part program on a workingstep basis so that the entire part program is categorized into a setup workingstep and a plurality of machining workingsteps; creating tool information, machine function information, and machining technology information for each of the machining workingsteps by using the G-code block information corresponding to the machining workingstep, and creating internal information of the machining workingsteps by using the created information, wherein the internal information includes a means for creating machining operation information for categorizing machining operations into rough cutting and finish cutting, a means for creating manufacturing feature information of a corresponding machining workingstep by removing a region to be cut from a material region through a Boolean operation, and a means for creating machining strategy information including an approach strategy, a retract strategy, and a machining strategy of a tool; and if all the internal information of each of the machining workingsteps is created, arranging the machining workingsteps in the same sequence as that of machining operations executed in the G-code part program so as to create the STEP-NC part program.

Advantageous Effects

The method of transforming a G-code into a STEP-NC part program according to the present invention allows a G-code type part program mainly used in the field to be easily applied to a STEP-NC controller without an additional manual operation. Thus, there is an advantage in that manpower and time consumed for introducing a STEP-NC controller can be remarkably reduced.

Furthermore, according to the present invention, a user who suffers from unfamiliarity with a new programming method used in the STEP-NC controller is provided with a method of creating a program in a conventional manner to drive a STEP-NC controller. Thus, there is an advantage in that the method of the present invention can contribute to expanding the use of the STEP-NC controller.

BRIEF DESCRIPTION OF THE DRAWINGS

FIG. 1 is a view showing the configuration of a machining system to which a method of transforming a G-code into a STEP-NC part program according to the present invention is applied.

FIG. 2 is a flowchart illustrating the method of transforming a G-code into a STEP-NC part program according to an embodiment of the present invention.

FIG. 3 is a table showing a data structure of block information.

FIG. 4 is a flowchart specifically illustrating the step of creating internal information of each workingstep shown in FIG. 2.

FIG. 5 is a flowchart specifically illustrating the step of creating machining operation information shown in FIG. 4.

FIG. 6 is a table showing conditions for determining rough/finish cutting by operation type, and the types of detailed operations depending on the determination results.

FIG. 7 is a flowchart specifically illustrating the step of creating manufacturing feature information shown in FIG. 4.

FIG. 8 is a table showing a method of mapping manufacturing features according to machining operations and profile-defining elements.

FIG. 9 is a view showing cutting edge angles of an outer or inner diameter contouring tool defined in a STEP-NC data model.

FIG. 10 is a view showing the cutting edge angles shown in FIG. 9 and cutting edges determined according to a trajectory direction.

FIG. 11 is a view showing cutting edges of a grooving tool and a drilling tool.

FIG. 12 is a flowchart specifically illustrating the step of creating machining strategy information shown in FIG. 4.

EXPLANATION OF REFERENCE NUMERALS FOR MAIN PORTIONS IN DRAWINGS

10: Input information 11: G-code part program
12: Tool information 13: Controller information
300: G-code converter 400: STEP-NC part program
500: STEP-NC system 510: STEP-NC controller
520: STEP-NC storage unit

BEST MODE FOR CARRYING OUT THE INVENTION

Hereinafter, preferred embodiments of the present invention will be described in detail with reference to the accompanying drawings.

FIG. 1 is a view showing the configuration of a machining system to which a method of transforming a G-code into a STEP-NC part program according to the present invention is applied.

A G-code converter 300 is an apparatus for converting a G-code by using a method of transforming a G-code into a STEP-NC part program according to the present invention. As shown in FIG. 1, the G-code converter receives a variety of information 10 including a G-code part program from a CAM or a user, processes the received information 10, and outputs a STEP-NC language type part program 400.

The information 10 inputted into the G-code converter 300 includes a G-code part program 11, tool information 12, numerical controller information 13, final shape information 14, and machined material information 15. Here, the G-code part program 11, the tool information 12, and the numerical controller information 13 are mandatory input information for creating the STEP-NC part program 400, and the final shape information 14 and the machined material information 15 are additional information that may be optionally inputted.

The G-code part program 11 is a G-code type part program that is to be converted into the STEP-NC part program 400, and it is preferably to prepare a correct program that does not include an unnecessary tool and tool path so that an error may not occur during a conversion process.

The tool information 12 is information related to all machining tools specified in the G-code part program, and includes information on tool types as well as information on specifications of tool holders and inserts. The tool type is categorized into those for outer diameter rough and finish cutting, inner diameter rough/finish cutting, grooving, drilling, threading, knurling, and the like. In practice, since there are various types of tools used for turning and each manufacturer has a different specification, it is preferable to include information on manufacturers. In addition, the tool holder specification includes the types and geometric information of tool holders (e.g., PCLNR2525-M12), and the insert specification includes the types and geometric information of inserts (e.g., CNMG12040).

The numerical controller information 13 includes information on controller manufacturers, controller types, whether to execute turning or milling, the number of axes to be controlled, and the like, and is information used for correctly analyzing unique codes of controller manufacturers in addition to common codes among G-codes.

The final shape information 14 is a CAD file for a final shape, which is additional information provided for user's convenience. Even though the final shape information is not included in input information, the final shape information can be created through the method of transforming a G-code into a STEP-NC part program according to the present invention.

The machined material information 15 includes information on the geometric type, size, quality of a machined material, and is additional information conveniently used for creating manufacturing feature information that will be described below.

Meanwhile, the format of the STEP-NC part program 400 outputted from the G-code converter 300 conforms to ISO 10303 Part 21 (Clear Text Encoding File). The STEP-NC part program comprises workingsteps that are categorized by sequentially executed machining operation, and each of the workingsteps has information on a machining operation, a manufacturing feature, geometry, a machining strategy, machining technology, a machine function, and a machining tool. In addition, a data model of the STEP-NC part program 400 basically conforms to ISO 14649. Since the data model of ISO 14649 is almost similar to that of ISO 10303-AP238 in structure and different only in expression, it is desirable to include the ISO 10303-AP238 data model.

Such a STEP-NC part program 400 is transmitted from the G-code converter 300 to a STEP-NC system 500 that comprises a STEP-NC controller 510 and a STEP-NC storage unit 520 through a network such as a local area network (LAN) or the Internet, or a communication cable such as an RS-232 cable.

The STEP-NC controller 510 creates a tool path by analyzing the inputted STEP-NC part program 400 and controls an NC operation according to the tool path to execute machining.

The STEP-NC storage unit 520 is a database for storing the STEP-NC part program transmitted to the STEP-NC controller 510 or created within the STEP-NC storage unit itself, and allows the STEP-NC controller 510 to retrieve a required part program that in turn is used for machining.

As described above, the G-code converter 300 is configured separately from the STEP-NC system 500 in this embodiment. However, the G-code converter 300 may be incorporated into the STEP-NC system 500 or into offline CAM software for supporting the STEP-NC system 500.

Hereinafter, a method of converting a G-code into a STEP-NC part program according to an embodiment of the present invention will be described with reference to FIG. 2. Here, detailed processes of the conversion will be described in connection with application thereof to a two-axis lathe.

The data structure of the STEP-NC language comprises a top level project entity for obtaining a finished product by means of machining through a CNC controller, and lower level workplan entities for executing machining for one setup by which the position of a workpiece is constantly maintained. In addition, object-oriented workingsteps are defined on a work basis within each workplan. Within the workingstep, a feature to be machined through the execution of a corresponding workingstep is defined, and all process information needed to machine the feature is included. A STEP-NC part program contains a plurality of workingsteps, and the respective workingsteps are executed in sequence or in parallel depending on the capacity of the controller. Accordingly, the method of converting a G-code into a STEP-NC part program includes the step of analyzing a G-code program and sequentially converting the G-code program into a STEP-NC part program format.

First, information such as a G-code part program, tool information, and numerical controller information is inputted (S10).

Next, the inputted G-code part program is analyzed based on the type of the numerical controller, and G-code block information is created (S20). The G-code part program comprises blocks each of which is a syntax unit processed at a time by the numerical controller. The block information having a data structure shown in FIG. 3 can be created by analyzing T, S, F, M-codes, and the like as well as the G-code contained in the block.

As shown in FIG. 3, the data structure of the block information contains a G-code value, a feed end point, a feed start point, a feed radius, a feedrate, a spindle speed, a maximum spindle speed, a tool number, a tool compensation type, a tool compensation value, a trajectory direction, and a trajectory length. Here, the trajectory direction is the direction of a vector from the feed start point to the feed end point, and the trajectory length corresponds to the length of the vector. Here, it is preferred that the G-code value be appropriately coded and then stored to include the values of the T, S, F, and M-codes in addition to the G-code.

As an example of the block information, if the G-code part program is N01 G50 S420; N02 G97 S205 T0100 M01; N03 G00 X85.0 Z180.0; N04 G01 X85.0 Z0.0 F0.2, and the type of the controller is one of FANUC 0 series, block information corresponding to block N04 is such that G-code=01, feed end point=X85.0 Z0.0, feed start point=X85.0 Z180.0, feed radius=0, feedrate=0.2, spindle speed=205, maximum spindle speed=420, tool number=01, tool compensation type=off, tool compensation value=X0.0 Z0.0, trajectory direction=X0.0, Z-180.0, and trajectory length=180.

When the step of creating block information S20 is completed, the created blocks are grouped, and information on a workingstep that is a basic working unit of the STEP-NC data model is created. The entire part program is partitioned on a workingstep basis along the boundary of a featured block where a used tool, a spindle speed, a feedrate, a machining direction or a machining region is changed (S50).

The respective workingsteps partitioned by such a featured block can be categorized into a setup workingstep and a machining workingstep. The setup workingstep has only setting information on a coordination system, absolute or relative commands, a feed per minute or rotation, constant surface speed control or neglect of constant control, setting of an initial origin, a spindle speed, use of cutting oil, and the like. Thus, a machining path does not need to be traced. From the setup workingstep, it is possible to obtain machining technology information, machine function information and the like, which will be described later. The information created in the setup workingstep has influence on subsequent machining workingsteps, so that the machining workingsteps can be set to values of the machining technology information or machine function information. If another setup workingstep appears, following machining workingsteps are re-set to information of the new setup workingstep. Meanwhile, the machining workingstep is a group of blocks that instruct machining through a feed of a tool, and is the step of actually executing machining. Each of the machining workingsteps is a workingstep that can be defined as a machining operation. The blocks included in the machining workingstep have codes G00, G01, G02, G03 and the like among G-codes and feed a tool in a manner of a rapid feed or a cutting feed.

Here, a method of partitioning the entire blocks of the part program into workingsteps will be described in greater detail.

Primary partitioning is performed by searching for, from the G-code part program, blocks containing only the setting information on a coordination system, absolute or relative commands, a feed per minute or rotation, constant surface speed control or neglect of constant control, setting of an initial origin, a spindle speed, use of cutting oil, and the like, by categorizing the blocks as setup workingsteps, and by dividing remaining blocks along the boundary of a featured block where a machining tool is changed. The reason of performing the primary partitioning is that blocks can be grouped into block groups of broadest categories since operators usually create a part program in consideration of minimization of tool exchange upon machining, and that since a machining method varies according to a tool type, analysis of the machining method also varies depending on the tool.

Secondary partitioning is then performed on the respective blocks, which have been partitioned through the primary partitioning, along the boundary of a featured block where a feedrate or a spindle speed is changed. Since the change of the feedrate or the spindle speed means the change of the quality of a machined surface, the feedrate or the spindle speed is not generally changed in an identical operation. Among blocks that fall in a block group obtained through the primary partitioning and use an identical tool, blocks where the feedrate or the spindle speed is changed provide a clue that different machining will be executed. Thus, featured blocks where the feedrate or the spindle speed is changed become boundaries for the secondary partitioning. Tertiary partitioning is performed on the respective blocks, which have been partitioned through the secondary partitioning, along the boundary of a featured block where the machining direction or the machining region is changed. Even though the same tool is used at the same feedrate and spindle speed upon machining, the machining direction (e.g., face machining perpendicular to the z-axis and outer diameter contouring cutting parallel to the z-axis) may be different. In addition, even though the aforementioned conditions are the same, a different machining region means a different workingstep. Thus, an operation for searching for featured blocks where the machining region is changed is performed. Each of the block groups that are finally partitioned through these partitioning operations is determined as a workingstep, i.e., a basic operation unit, and particularly defines a machining operation for the machining workingstep. Here, if a fixed cycle code exists in the G-code part program, the workingstep is created through an additional process of analyzing the cycle code.

When the step of partitioning the part program into workingsteps S50 is completed in such a manner, internal information of the machining workingstep, which includes tool information, machining technology information, machining operation information, manufacturing feature information, and machining strategy information, is created for each machining workingstep using G-code block information corresponding to the machining workingstep (S100).

When all information on the machining workingsteps is created and all blocks of the G-code part program are analyzed by sequentially executing step S100 for all the machining workingsteps, the machining workingsteps are arranged in the same sequence as the machining operations performed in the G-code part program. The arranged workingsteps are sequentially included in a workplan entity, and the workplan entity is finally included in the project entity, thereby preparing a complete STEP-NC part program (S800).

Next, the STEP-NC part program created in step S800 is shown to a user so that the user can verify and confirm the STEP-NC part program (S900). It is preferred that information, such as machining operations, manufacturing features thereof, and the like, be corrected while being visually confirmed through a graphic user interface (GUI).

Hereinafter, the step of creating internal information of each machining workingstep shown in FIG. 2 will be described in greater detail with reference to FIG. 4.

First, by using tool information included in input information, tool information defined in a STEP-NC data model is created for a tool used in a corresponding machining workingstep (S200). An M-code is analyzed from the G-code block information of the corresponding machining workingstep, and machine function information related to the M-code is created (S300). In addition, machining technology information, including a feedrate, a spindle speed, a maximum spindle speed, and the like, is created by referring to the G-code block information (S400). These steps do not need to be performed sequentially, and each of the information is created in order of description in the G-code block.

Next, by referring to the tool information, machine function information, and machining technology information created in steps S200 to S400, machining operation information is created to be categorized into face machining, outer diameter contouring cutting, grooving, drilling, and inner diameter contouring cutting operations according to the tool type and the machining direction, and subsequently to be subcategorized into rough cutting and finish cutting according to whether to execute rough cutting, a spindle speed, and a federate (S500).

When the step of creating machining operation information S500 is completed, a region to be removed by an interpolated feed of the machining workingstep as well as a machining profile is calculated by referring to the G-code block information, the machining operation type of the machining operation information, and the tool type and tool feature of the tool information, and manufacturing feature information is then created based on geometry information produced from the machining profile (S600). In addition, by referring to the machining operation type of the machining operation information and the tool type of the tool information, and by using an interpolated feed vector and a rapid feed vector obtained from the G-code block information, machining strategy information including an approach/retract strategy of a tool and a machining strategy related to a machining method is created (S700), thereby completing the step of creating internal information of a unit machining workingstep SI00.

Hereinafter, the step of creating machining operation information shown in FIG. 4 will be described in greater detail with reference to FIG. 5.

First, a machining workingstep and corresponding block information created in the steps of analyzing a G-code and partitioning workingsteps are received (S510), and the tool type of the corresponding workingstep is determined (S520).

If the tool type is an outer diameter contouring tool in step S520, it is first determined whether a machining direction is parallel to the x-axis (S530). Here, if the machining direction is not parallel to the x-axis, a corresponding operation type is recognized as outer diameter contouring cutting. Otherwise, the operation type is recognized as face machining.

If the tool type is a grooving tool in the step of determining a tool type S520, a machining path is examined, and it is determined whether corresponding machining severs a material to be machined (S540). Here, the x-value of an interpolated feed end point of a grooving tool is examined. If the x-value is smaller than zero, it is determined that the material to be machined is to be severed. If it is determined in step S540 that the material to be machined is to be severed, a corresponding operation type is recognized as face machining. Otherwise, the operation is recognized as grooving (S550).

If the tool type is an inner diameter contouring cutting tool, a drilling tool, a threading tool, or a knurling tool in the step of determining a tool type S520, a corresponding operation type is recognized as inner diameter contouring cutting, drilling, threading, or knurling, respectively.

In this manner, an operation type is recognized according to the tool type, and operation information thereon is created (S550).

Thereafter, a cutting method that is categorized into rough cutting and finish cutting is determined according to the operation type (S560), and detailed operation information and associated attribute values are created according to the operation type of a corresponding workingstep (S570). The conditions for determining rough or finish cutting of each operation type in steps S560 and S570 and a method of determining a detailed operation type according to the conditions will be described below with reference to FIG. 6.

In a case where the operation type is outer diameter contouring cutting, face machining, or inner diameter contouring cutting, if rough cutting of an identical machining type for an identical machining region already exists in a previous workingstep, or if a finish cutting tool is used or a higher spindle speed and a lower feedrate are set in a corresponding workingstep as compared with rough cutting, the operation is determined as finish cutting. Otherwise, the operation is recognized as rough cutting.

On the other hand, in a case where the operation type is grooving, if rough grooving for an identical machining region already exists in a corresponding workingstep, or if a higher spindle speed and a lower feedrate are set in a corresponding workingstep as compared with rough cutting, the operation is determined as finish cutting. Otherwise, the operation is recognized as rough cutting.

Here, geometric information of a manufacturing feature created in a previous workingstep is compared with geometric information obtained from a feed start point and a feed end point included in block information of a current machining workingstep. If the two geometric information is almost the same, it is determined that identical machining exists in the same machining region.

In a case where the machining type is outer diameter contouring cutting, face machining, grooving, or inner diameter contouring cutting, according to whether the cutting method determined in the step of determining rough/finish cutting S560 is rough cutting or finish cutting, a detailed operation is recognized as outer diameter contouring rough cutting, outer diameter contouring finish cutting, rough grooving, finish grooving, inner diameter contouring rough cutting, or inner diameter contouring finish cutting. In addition, in a case where the machining type is drilling, if a center drilling tool is used to make a small indent in a material as a preparatory operation, the operation is recognized as a center drilling operation. If a general drilling tool is used, the operation is recognized as a drilling operation.

Each of the detailed operations recognized as described above has differently defined internal attribute values. In the step of creating detailed operation information S570, the internal attribute values of a recognized detailed operation are determined by referring to the block information in a corresponding workingstep.

Hereinafter, the step of creating manufacturing feature information shown in FIG. 4 will be described in greater detail with reference to FIG. 7.

First, a region to be machined is determined from feature information of a material to be machined (S610). In case of a first machining workingstep, if the aforementioned input information 10 contains feature information 15 of the material to be machined, a material region to be machined is created according to the material information. If the aforementioned input information does not contain the feature information 15, an appropriate material region to be machined is determined in consideration of a start point of a first rapid feed of a G-code part program. A material region to be machined, which remains after execution of a previous machining workingstep, is used as a material region to be machined for a subsequent machining workingstep.

Next, a cutting edge is determined based on the tool type and the trajectory direction of an interpolated feed (S620). The cutting edge means an edge of a tool that is to be brought into contact with a material to be machined upon execution of machining. A method of determining a cutting edge for each tool type will be described below in detail.

When a cutting edge is determined in step S620, a region of a material to be machined, which is to be removed by the cutting edge of the tool according to an interpolated feed, is determined (S630). The region to be machined is removed from the material through a subtract Boolean operation, thereby obtaining a machining profile of the material that finally remains (S640). Here, the profile information includes information on the types, positions, directions and the like of lines defining the profile.

Thereafter, by using the profile information of the material obtained in step S640, manufacturing feature information defined in the STEP-NC data model is created. As shown in FIG. 8, manufacturing features are mapped according to a machining operation type, the number of segments or arcs defining a profile, the type of an element defining the profile, and the slope of the element defining the profile (S650). That is, if the machining operation is face machining, outer diameter contouring cutting, or inner diameter contouring cutting, the machining operation is mapped to circular_face, outer_diameter, revolved_round, revolved_flat, or general_revolution defined in the STEP-NC data model according to the number of the profile-defining elements, and the type and slope of a segment or arc. In a case of grooving, the machining operation is mapped to groove, whereas in a case of drilling, the machining operation is mapped to round_hole. Here, the profile-defining elements are elements obtained by excluding profile-defining elements of a material before machining from an entire profile of the material after machining, and means profile-defining elements that are newly created through machining. For example, if a workingstep is recognized as outer diameter contouring rough cutting in the step of creating machining operation information S500 and also recognized as having three profile-defining elements all of which are a segment type in the step of creating machining profile information from a region to be machined S640, the machining operation is mapped to general_revolution as shown in FIG. 8.

Information to be stored in the step of mapping a machining feature using a machining profile S650 includes the type of a mapped feature and information on geometric features defining the profile, i.e., sub-information on the mapped feature, such as coordinates of the origin of the profile, straight lines that are a type of segment defining the profile, and coordinates and directions of points for the straight lines.

Hereinafter, a method of determining a cutting edge upon machining will be described with reference to FIGS. 9 to 11.

FIG. 9 is a view showing cutting edge angles of an outer or inner diameter contouring tool defined in a STEP-NC data model, FIG. 10 is a view showing the cutting edge angles shown in FIG. 9 and cutting edges determined according to a trajectory direction, and FIG. 11 is a view showing cutting edges of a grooving tool and a drilling tool.

As shown in FIG. 9, an edge formed at a side of an insert 610 of an outer or inner diameter contouring tool 600 is called a side cutting edge 611, and an absolute value of an angle between the side cutting edge and the z-axis is called a side cutting edge angle $\theta s$. In addition, an edge formed at an end of the insert 610 is called an end cutting edge 612, and an absolute value of an angle between the end cutting edge and the z-axis is called an end cutting edge angle $\theta e$.

A cutting edge used for machining is determined by a trajectory direction and a cutting edge angle. If the trajectory direction is located between (180°−side cutting edge angle) and (180°+end cutting edge angle) as shown in FIG. 10(a), the side cutting edge is determined as the cutting edge. If the trajectory direction is located between (90°+side cutting edge angle) and (360°+end cutting edge angle) as shown in FIG. 10(b), the end cutting edge is determined as the cutting edge. If the trajectory direction is located between (180°+end cutting edge angle) and (90°+side cutting edge angle) as shown in FIG. 10(c), a combination of the end cutting edge and the side cutting edge is determined as the cutting edge.

Cutting edges of a grooving tool and a drilling tool correspond to tips of the tools as shown in FIG. 11.

Hereinafter, detailed procedures of the step of creating machining strategy information S700 shown in FIG. 4 will be described with reference to FIG. 12.

First, a corresponding machining workingstep and block information corresponding thereto are retrieved (S710).

Then, by referring to the machining workingstep and the block information, information on an approach strategy and a retract strategy of the corresponding workingstep is created (S720).

Here, the approach strategy information of the machining workingstep is created if a rapid feed block exists prior to a first interpolated feed within the corresponding workingstep. The approach strategy defined in the STEP-NC data model is categorized according to the type of a feed vector produced from rapid feed blocks. The approach method is recognized as a plunge tool axis if the feed vector is perpendicular to the tool axis, as a plunge ramp if the feed vector has a slope, as a plunge helix if the feed vector is an arc, and as a plunge zigzag if the feed vector is in a zigzag form.

In addition, the retract strategy of the machining workingstep is created if a rapid feed block exists after a last interpolated feed within the corresponding workingstep, and the type and recognition method thereof are the same as those of the approach strategy.

If the step of creating the approach and retract strategies S720 is completed, the type of a tool used in the corresponding workingstep is determined (S730).

If it is determined in step S730 that the tool used in the corresponding workingstep is an inner or an outer diameter contouring tool, a machining strategy is established in consideration of a machining direction according to a combination of a rapid feed and an interpolated feed (S740). The machining strategy is established as bidirectional turning if machining is performed in opposite directions, as unidirectional turning if machining is performed only in one direction, and as contour turning if only an interpolated feed is performed along a profile of a final shape. Here, the bidirectional turning is allowed only when a neutral type tool is used, and the contour turning corresponds to a case where only interpolated feeds are consecutively arranged and a tool is subjected to the interpolated feeds along the profile of the final feature.

When the step of establishing a machining strategy S740 is completed, corresponding machining strategy information is created and associated attribute values are set (S750), thereby completing the step of creating machining strategy information S700. At this time, the associated attribute values are different according to the types of machining strategies and are obtained from block information of a machining workingstep.

On the other hand, if the tool type is determined as a grooving tool in the step of determining a tool type S730, the machining strategy is automatically recognized as a multistep grooving strategy, and the step of creating machining strategy information S750 is then performed.

The present invention described above is not limited to the aforementioned embodiments and the accompanying drawings. It will be readily apparent to those skilled in the art that various substitutions, modifications and changes can be made thereto without departing from the technical spirit and scope of the present invention.

INDUSTRIAL APPLICABILITY

The method of converting a G-code into a STEP-NC part program according to the present invention provides a part program conversion method capable of automatically converting a G-code type part program into a STEP-NC language type part program, thereby allowing the G-code type part program mainly used in the field to be easily applied to a STEP-NC controller without an additional manual operation.

Furthermore, a user who is unfamiliar with a STEP-NC language type part program is provided with a method of creating a program in a conventional manner to drive a STEP-NC controller, thereby allowing the user to easily adapt to the STEP-NC controller when the STEP-NC controller is initially introduced.

The invention claimed is:

1. A method of transforming a G-code into a STEP-NC part program to convert a G-code type part program into a STEP-NC language type part program, the method comprising the steps of:
   receiving the G-code part program needed for creating the STEP-NC part program, tool information, and information on a numerical controller capable of analyzing a corresponding G-code;
   analyzing the received G-code part program according to the type of the numerical controller, and creating G-code block information;
   detecting a featured block by using the G-code block information, grouping G-code blocks along a boundary of the featured block, and partitioning the entire part program on a workingstep basis so that the entire part program is categorized into a setup workingstep and a plurality of machining workingsteps;
   creating tool information, machine function information, and machining technology information for each of the machining workingsteps by using the G-code block information corresponding to the machining workingstep, and
   creating internal information of the machining workingsteps by using the created information, the internal information including a means for creating machining operation information for categorizing machining operations into rough cutting and finish cutting, a means for creating manufacturing feature information of a corresponding machining workingstep by removing a region to be cut from a material region through a Boolean operation, and a means for creating machining strategy information including an approach strategy, a retract strategy, and a machining strategy of a tool; and
   if all the internal information of each of the machining workingsteps is created, arranging the machining workingsteps in the same sequence as that of machining operations executed in the G-code part program so as to create the STEP-NC part program.

2. The method as claimed in claim 1, wherein the step of partitioning the part program into the workingsteps comprises the steps of:
   detecting, from the G-code part program, blocks containing only setting information including an initial origin, a spindle speed, and use of cutting oil, and categorizing the corresponding blocks as the setup workingstep;

performing primary partitioning for blocks other than the blocks categorized as the setup workingstep, along a boundary of a featured block where a machining tool is changed;

performing secondary partitioning for the primarily partitioned blocks along a boundary of a featured block where a feedrate or a spindle speed is changed; and performing tertiary partitioning for the secondarily partitioned blocks along a boundary of a featured block where a machining direction or a machining region is changed.

3. The method as claimed in claim 1, wherein the means for creating machining operation information comprises the steps of:

retrieving the machining workingsteps and the block information created in the steps of analyzing the G-code and partitioning the part program into the workingsteps;

determining a tool type of a corresponding workingstep;

recognizing an operation type and creating corresponding operation information in consideration of a machining direction or interpolated feed coordinates according to the tool type;

determining a cutting strategy according to the operation type recognized in the step of creating the operation information, the cutting strategy being divided into rough cutting or finish cutting; and creating detailed operation information and setting attribute values thereof according to the operation type recognized in the step of creating the operation information and according to determination results in the step of determining the rough cutting or finish cutting.

4. The method as claimed in claim 1, wherein the means for creating the manufacturing feature information comprises the steps of:

setting a region to be machined from feature information of a material to be machined;

determining a cutting edge by using a tool type and a trajectory direction of an interpolated feed;

obtaining a region to be machined where the material is removed by the cutting edge of the tool through the interpolated feed;

producing a machining profile of the material that finally remains after the region to be machined is removed from the material through a subtract Boolean operation; and determining the manufacturing feature information by using the machining profile of the material produced in the step of producing the profile information of the material.

5. The method as claimed in claim 1, wherein the means for creating the machining strategy information comprises the steps of:

receiving a corresponding machining workingstep and block information corresponding thereto;

creating information on an approach strategy and a retract strategy of a corresponding workingstep by referring to the machining workingstep and the block information;

determining a tool type used in the corresponding workingstep;

establishing an operation strategy according to the tool type determined in the step of determining the tool type, in consideration of a machining direction depending on a combination of a rapid feed and an interpolated feed; and creating corresponding machining strategy information and setting attributes values thereof.

6. The method as claimed in claim 1, wherein the STEP-NC part program created in the step of creating the part program conforms to a specification of ISO 14649 or ISO 10303-AP238.

7. A computer readable storage medium with a program for executing the method of transforming a G-code into a STEP-NC part program according to claims 1 to 6 stored therein.

\* \* \* \* \*